United States Patent [19]
Jeske et al.

[11] Patent Number: 5,841,629
[45] Date of Patent: Nov. 24, 1998

[54] HIGH VOLTAGE HYBRID DESIGN SWITCHGEAR

[75] Inventors: Klaus-Dieter Jeske, Herzogenaurach; Manfred Meinherz, Berlin, both of Germany

[73] Assignee: Siemens Aktiengesellschaft, München, Germany

[21] Appl. No.: 938,726

[22] Filed: Sep. 26, 1997

[30] Foreign Application Priority Data

Sep. 27, 1996 [DE] Germany .................. 196 41 391.5

[51] Int. Cl.⁶ ............................................. H02B 5/00
[52] U.S. Cl. ................................. 361/603; 361/611
[58] Field of Search ................... 361/600–605, 361/611–612, 624, 637, 639

[56] References Cited

U.S. PATENT DOCUMENTS

| | | | |
|---|---|---|---|
| 4,072,999 | 2/1978 | Volman et al. | 361/602 |
| 4,237,520 | 12/1980 | Oishi et al. | 361/604 |
| 4,360,849 | 11/1982 | Harris et al. | 361/603 |
| 4,752,859 | 6/1988 | Chabala et al. | 361/602 |
| 4,752,860 | 6/1988 | Romanet et al. | 361/602 |

*Primary Examiner*—Gregory D. Thompson
*Attorney, Agent, or Firm*—Kenyon & Kenyon

[57] ABSTRACT

A high-voltage hybrid design switchgear with three power switch housings (1, 2, 3) arranged next to one another in series, each of which is connected to a horizontally arranged cylindrical adapter box (14, 15, 16). The adapter boxes (14, 15, 16) are arranged with their axes in parallel. Each adapter box has at least one high-voltage outdoor terminal (22, 23, 24) at a different distance from the series of power switch housings (1, 2, 3).

8 Claims, 3 Drawing Sheets

HIGH VOLTAGE HYBRID DESIGN SWITCHGEAR

FIELD OF THE INVENTION

The present invention relates to a high-voltage hybrid design switchgear.

BACKGROUND INFORMATION

In high-voltage hybrid design switchgear, one or more functional elements, such as switches or current converters, are present in a metal enclosure, while other parts, in particular the connecting lines between the various elements, are present in an unenclosed design.

Such a design not only reduces space requirements compared to those of outdoor switchgear, but also allows finished components to be used in a metal-enclosed form and arranged as desired in a simple manner. Modifications and temporary add-ons are particularly simplified in this way. Maintenance work can be facilitated by the free accessibility of the connecting lines and other elements in the switchgear.

Such a hybrid switchgear is described, for example, in German Utility Patent, Document Number G 94 17 477.6.

SUMMARY OF THE INVENTION

An object of the present invention is to provide a high-voltage hybrid design switchgear offering a compact arrangement of a plurality of high-voltage elements.

The aforementioned object is achieved according to the present invention through a high-voltage switchgear with three power switch housings arranged next to one another in series, each of which is connected to a horizontal cylindrical adapter box with the adapter boxes being arranged with their axes parallel to one another and having at least one high-voltage outdoor terminal at different distances from the series of power switch housings.

Due to the axial offset of the high-voltage outdoor terminals, the adapter boxes do not need to be as far apart as they would if the high-voltage outdoor terminals were provided at the same height axially on the adapter boxes. The different high-voltage outdoor terminals must be separated by a certain minimum distance to ensure the breakdown strength necessary for high voltage.

With the switchgear design of the present invention, the power switch housings and the adapter boxes can be arranged relatively close to one another in parallel, which not only saves space, but also facilitates maintenance. The unenclosed conductors for the different phases can be run from the high-voltage outdoor terminals parallel to one another and connected to the terminals.

In one advantageous embodiment of the present invention, each high-voltage outdoor terminal has two high-voltage feed-throughs, each with an insulator, with the insulators forming the legs of a V when viewed in the axial direction of the adapter boxes. The two high-voltage feed-throughs on each high-voltage outdoor terminal provide a variety of connection options within the switchgear. The V-shape of the feed-through insulators ensures sufficient distance between the open terminal contacts of the high-voltage feed-throughs.

According to another advantageous embodiment of the present invention, both insulators of each high-voltage outdoor terminal are arranged one behind the other in the axial direction of the adapter boxes.

With this arrangement, each high-voltage feed-through is freely accessible and proper conditions have been created for maintenance without substantially increasing the space needed. In addition, capabilities for electrically insulating one of the feed-throughs can be provided using an isolating switch.

The present invention can also be advantageously implemented by providing each high-voltage outdoor terminal with two partial housings having an identical design and arranged coaxially one behind the other, with each partial housing having an insulator arranged symmetrically to that of the other partial housing.

This construction is both simple and economical, since by using the same parts for each of the feed-throughs, by virtue of the symmetrical arrangement, manufacturing and storage costs of these parts are reduced.

The switchgear of the present invention can also be advantageously designed so that each power switch housing has a high-voltage feed-through for connection to an open line.

It can also be provided that at least one transformer is arranged laterally next to the adapter boxes, and one of the high-voltage feed-throughs of each high-voltage outdoor terminal is connected with the respective high-voltage terminal of said transformer.

In this configuration, the present invention allows a transformer to be arranged in a particularly compact manner with line terminals that can be switched using power switches.

The present invention can also be advantageously used when the adapter boxes are arranged between two transformers and each of the high-voltage feed-throughs is connected to one of the transformers.

Each high-voltage feed-through can advantageously have an upstream isolating switch to allow the different feed-throughs of each high-voltage outdoor terminal to be isolated in a compact manner.

DETAILED DESCRIPTION

Figure 1:
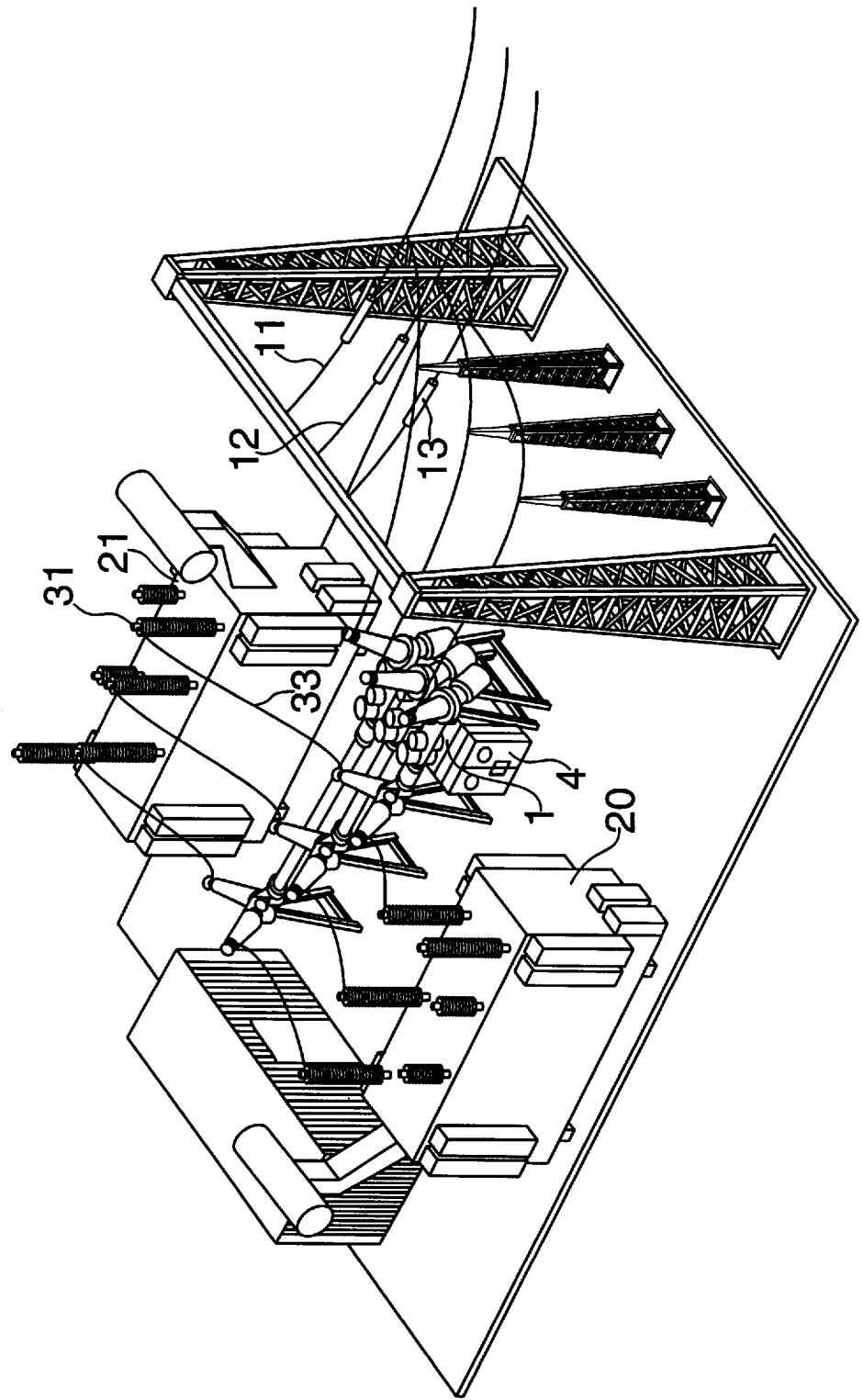
FIG. 1 shows a perspective view of a switchgear according to the present invention.
Figure 2:
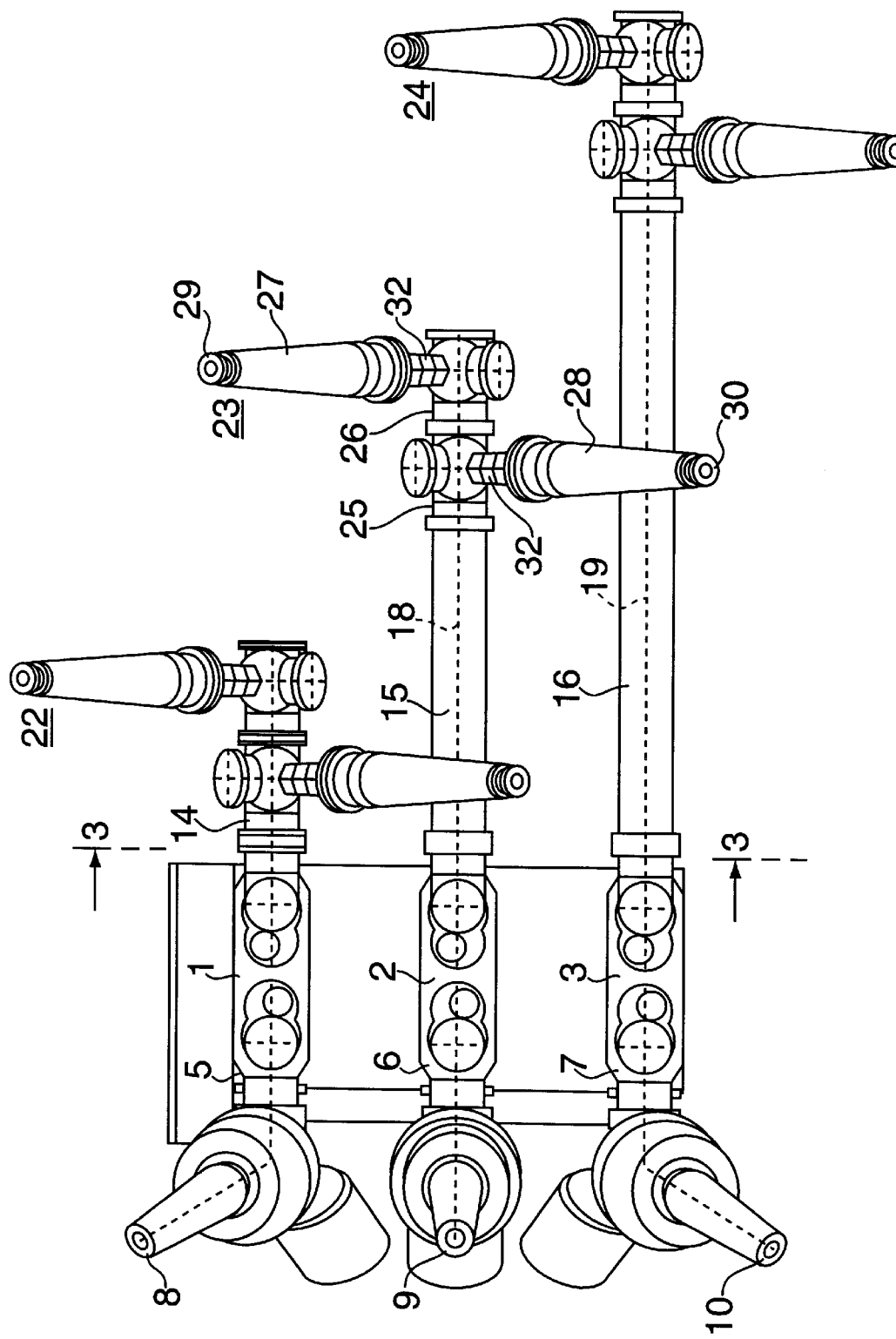
FIG. 2 shows a partial top view of the switchgear of the present invention.
Figure 3:
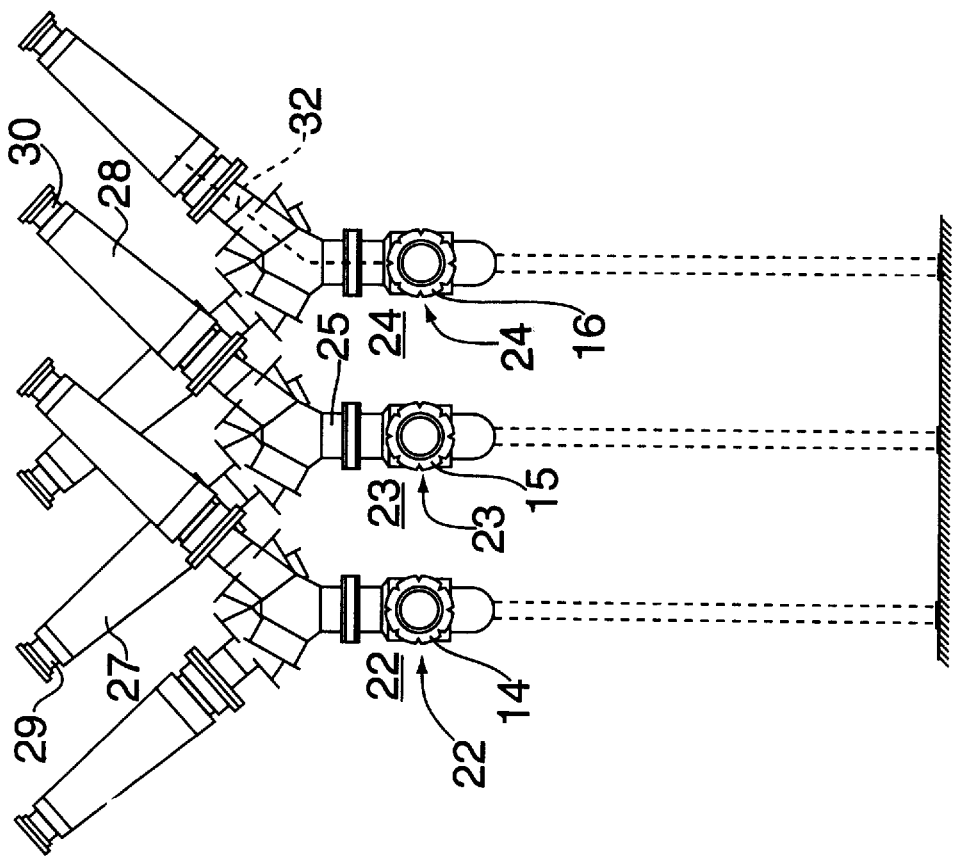
FIG. 3 shows an axial section (along line 3—3 of FIG. 2) of adapter boxes in accordance with the present invention.

FIGS. 1–3 show a high-voltage switchgear with three power switch housings 1, 2 and 3 arranged next to each other in series. In FIG. 1, power switch housing 1 is shown in the foreground. The circuit breaker units mounted in power switch housings 1–3 can be driven and controlled either jointly or individually using a common control and drive mechanism 4.

Each of the power switch housings 1, 2 and 3 is provided a respective end 5, 6 and 7 with a respective outdoor feed-through 8, 9 and 10 for connection to a respective open line 11, 12 and 13. At the end opposite to the outdoor feed-through, each enclosure 1, 2 and 3 is connected to a respective adapter box 14, 15 and 16, which has a cylindrical design with a horizontal cylinder axis.

The adapter boxes 15 and 16 enclose high-voltage lines 18 and 19, respectively, which serve for connecting a circuit breaker unit to one or two transformers 20 and 21. Adapter boxes 14, 15 and 16 have different lengths, so that the high-voltage outdoor terminals 22, 23 and 24 at their ends are arranged offset longitudinally in relation to adapter boxes 14, 15 and 16.

Each high-voltage outdoor terminal 22, 23, 24 has two partial housings 25 and 26, of identical design, connected to one another and rotated 180° in relation to a vertical axis, so that two cylindrical or conical insulators 27 and 28 of high-voltage feed-throughs 29 and 30 form a symmetrical design in the longitudinal direction of adapter boxes 14, 15 and 16.

An open line 33 goes from each insulator 27 and 28 to a phase terminal 31 of one of transformers 21. (See FIG. 1.) This ensures that the open lines do not cross and always maintain the minimum distance required for electrical safety. The distance between the high-voltage outdoor terminals in the longitudinal direction of the adapter boxes 14, 15 and 16 approximately corresponds to the distance between the terminals of the individual phases of transformers 20 and 21, so that the open lines run parallel to one another between transformers 20 and 21 and high-voltage outdoor terminals 22, 23 and 24.

The two insulators 27 and 28 of each high-voltage outdoor terminal 22, 23 and 24 are at an angle of approximately 90° in relation to their longitudinal axes. Each high-voltage feed-through 29 and 30 can be isolated from the respective power switch using an isolating switch 32 mounted in a partial housing 25, 26, so that the power switch can be connected to one of transformers 20 and 21, or to both transformers via the switchgear of the present invention.

What is claimed is:

1. A high-voltage hybrid design switchgear comprising:
three power switch enclosures arranged next to one another in series; and
three horizontally arranged cylindrical adapter boxes, each adapter box having an axis, wherein:
each of the power switch enclosures is connected to a respective one of the adapter boxes,
the adapter boxes are arranged with their axes substantially in parallel to each other, and
each adapter box includes at least one high-voltage outdoor terminal, the outdoor terminals of the adapter boxes being arranged at different distances from the power switch enclosures.

2. The high-voltage switchgear of claim 1, wherein each of the high-voltage outdoor terminals includes two high-voltage feed-throughs, each feed-through including an insulator, the insulators of each high-voltage outdoor terminal being arranged in a V-like configuration.

3. The high-voltage switchgear of claim 2, wherein the two insulators of each high-voltage outdoor terminal are arranged one behind the other, along the axis of the respective adapter box.

4. The high-voltage switchgear of claim 1, wherein each high-voltage outdoor terminal includes two similar partial enclosures arranged coaxially one behind the other, each partial enclosure including an insulator, the insulators of each high-voltage outdoor terminal being arranged symmetrically.

5. The high-voltage switchgear of claim 1, wherein each power switch enclosure carries a high-voltage feed-through for connection to an open line.

6. The high-voltage switchgear of claim 1, wherein at least one transformer is arranged next to the adapter boxes, the at least one transformer having high-voltage terminals which are connected to respective high-voltage feed-throughs of each high-voltage outdoor terminal.

7. The high-voltage switchgear of claim 6, wherein the adapter boxes are arranged between two transformers and each of the high-voltage feed-throughs is connected to a respective transformer.

8. The high-voltage switchgear of claim 2, wherein an isolating switch is connected upstream from each high-voltage feed-through.

* * * * *